(12) United States Patent
Wang et al.

(10) Patent No.: US 6,501,794 B1
(45) Date of Patent: Dec. 31, 2002

(54) SYSTEM AND RELATED METHODS FOR ANALYZING COMPRESSED MEDIA CONTENT

(75) Inventors: Ruoyu Roy Wang, Urbana, IL (US); Hong-Jiang Zhang, Beijing (CN); Ya-Qin Zhang, West Windsor, NJ (US)

(73) Assignee: Microsoft Corporate, Redmond, WA (US)

( * ) Notice: Subject to any disclaimer, the term of this patent is extended or adjusted under 35 U.S.C. 154(b) by 0 days.

(21) Appl. No.: 09/575,896

(22) Filed: May 22, 2000

(51) Int. Cl.[7] .................................................. H04N 7/36
(52) U.S. Cl. ............. 375/240.08; 348/699; 375/240.16; 382/236; 382/243
(58) Field of Search ...................... 375/240.16, 240.08; 382/107, 236, 243; 348/699; H04N 7/36

(56) References Cited

U.S. PATENT DOCUMENTS

| | | | | | |
|---|---|---|---|---|---|
| 5,777,690 | A | * | 7/1998 | Takeda et al. | 382/236 |
| 5,991,428 | A | * | 11/1999 | Taniguchi | 348/699 |
| 6,035,070 | A | * | 3/2000 | Moon et al. | 382/243 |
| 6,263,089 | B1 | * | 7/2001 | Otsuka et al. | 382/107 |
| 6,380,986 | B1 | * | 4/2002 | Minami et al. | 375/240.16 |

* cited by examiner

Primary Examiner—Howard Britton
(74) Attorney, Agent, or Firm—Lee & Hayes, PLLC

(57) ABSTRACT

A method comprising receiving media data in a compressed, digital domain, analyzing motion vectors associated with the received media content while in the compressed digital domain and identifying one or more objects in the received media data based, at least in part, on the motion vector analysis.

35 Claims, 7 Drawing Sheets

SYSTEM AND RELATED METHODS FOR ANALYZING COMPRESSED MEDIA CONTENT

TECHNICAL FIELD

The present invention relates to the field of image processing and, more particularly, to a system and related methods for analyzing compressed media content.

BACKGROUND INFORMATION

With recent improvements in processing and storage technologies, many personal computing systems have the capacity to receive, process and render multimedia objects (e.g., audio, graphical and video content). The Motion Picture Expert Group (MPEG), under the auspices of the International Standards Organization (ISO) and the International Telecommunications Union (ITU), have developed a number of standards digitizing and compressing multimedia to accommodate high bandwidth (MPEG-1 and MPEG-2), and low bandwidth (MPEG-4) applications.

Those skilled in the art will appreciate that in order to accurately represent a multimedia object in the digital domain requires a vast amount of data. Accordingly, it is common to "compress" the digitized multimedia object to satisfy storage media and/or communication bandwidth requirements. The MPEG coding includes information in the bit stream to provide synchronization of audio and video signals, initial and continuous management of coded data buffers to prevent overflow and underflow, random access start-up, and absolute time identification. The coding layer specifies a multiplex data format that allows multiplexing of multiple simultaneous audio and video streams as well as privately defined data streams.

The basic principle of MPEG system coding is the use of time stamps that specify the decoding and display the time of audio and video and the time of reception of the multiplexed coded data at the decoder. The basic scheme of MPEG is to predict motion from frame to frame in the temporal direction and then to use Discrete Cosine Transform (DCT) coefficients to organize the redundancy in the spatial directions.

In general, MPEG encodes video data into three types of frames, each frame comprising blocks of data and groups of blocks or macroblocks. A first frame type is an intra (I) frame. The I frame is a frame coded as a still image, not using any information from previous frames or successive frames. It is the first frame in the bit stream and contains texture and color information for the video sequence. A second frame type is a predicted (P) frame. The P frames in the bit stream are predicted from the most recently reconstructed I or P frame. Each block in the P frame can either have a vector and difference DCT coefficients or it can be intra coded, like the I frame. A third frame type is a bidirectional (B) frame. The B frame is predicted from the closest two I or P frames, one previous frame and one successive frame, in the bit stream.

When coding a compressed video sequence, the compression engine uses a forward vector and a rearward vector. The compression engine interpolates between two blocks of two frames to code the block currently being coded. If this is not possible, the block is intra-coded. The sequence of frames in a bit stream typically appears as IBBPBBPBBPB-BIBBPBBPB . . . .

There are typically twelve frames from I to I. This is based on a random access requirement; typically, a starting point is needed at least once very 0.4 seconds. Providing an I frame every twelve frames correlates to starting with an I frame every 0.4 seconds. To decode the bit stream, the I frame is first decoded followed by the first P frame. The two B frames in between the I frame and the P frame are then decoded. The primary purpose of the B frames is to reduce noise in the video by filling in or interpolating a three dimensional video signal, between the I and the P frames, typically over a 33 or 25 millisecond picture period without contributing to the overall signal quality beyond that immediate point in time.

The B frames and P frames contain the motion information. The I frame has no motion values and stores the DCT information of the original frame of the video sequence.

As alluded to above, the MPEG-1 and MPEG-2 standards were developed to accommodate high-bandwidth applications (e.g., high definition television (HDTV)), while MPEG-4 was developed for lower bandwidth applications, e.g., interactive video systems. An interesting aspect of the MPEG-4 standard, necessary to support such interactive features, is that a video frame is actually defined as a number of video objects, each assigned to their own video object plane (VOP). Accordingly, once an MPEG-4 video frame is decompressed, a number of independently manipulatable video objects may be identified through any of a number of prior art video analysis techniques.

When the compressed multimedia object is accessed for use, it is decompressed in accordance with the compression scheme used to compress the multimedia object, e.g., using the inverse discrete cosine transform (IDCT). Once decompressed further analysis of the multimedia objects may then be performed.

The standardization of such coding and compression techniques has fostered growth in multimedia peripherals and applications. An example application of such technology provides for the identification and manipulation of video objects extracted from video content. For example, in a video sequence depicting a person running across the street, it may be desirable to identify and manipulate the image of the person (or any other video object within the video sequence). Typically, to identify and manipulate a video object, the video sequence is received/retrieved, decompressed (e.g., using the IDCT) and analyzed in a decompressed digital domain. More particularly, the application analyzes the decompressed digital representation of the video content to identify the person walking across the street, making that video object available for further manipulation by an end-user. These prior art techniques, while effective, have a number of inherent limitations.

First, the decompressed video objects are represented by an extremely large amount of data (as compared to the same video object(s) in the compressed digital domain). Not only does this large amount of data require a large amount of storage space (e.g., Random Access Memory (RAM)), it increases the computational complexity of the identification and manipulation process. Second, the decompression process is lossy, i.e., filters are typically employed to eliminate coding artifacts and to smooth the resultant image. Accordingly, such prior art multimedia applications were typically limited to high-end computing systems with advanced processors, large storage capacity and fast bus speeds executing sophisticated applications.

Thus, a system and related methods for analyzing multimedia objects is required, unencumbered by the above limitations commonly associated with the prior art. Indeed, what is required is a system and related methods that enable more moderate computing systems to benefit from recent advances in multimedia technology. Just such a system and related methods are presented in the pages to follow.

SUMMARY

This invention concerns a system and related methods for analyzing media content in the compressed digital domain. According to a first implementation of the invention, a method comprising receiving media data in a compressed, digital domain, analyzing motion vectors of the received media data while in the compressed digital domain, and identifying one or more objects in the received media content based, at least in part, on the motion vector analysis. It is to be appreciated that identification of the one or more objects, i.e., dominant objects and subordinate objects, facilitates a host of applications to track and manipulate individual objects while in the compressed, digital domain.

DETAILED DESCRIPTION

As introduced above, the present invention is drawn to a media analysis agent and related methods for analysis of compressed media content. In the following description of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to variously as operations, steps, blocks, functions, agents, engines, or modules.

Example Computing System

Figure 1:
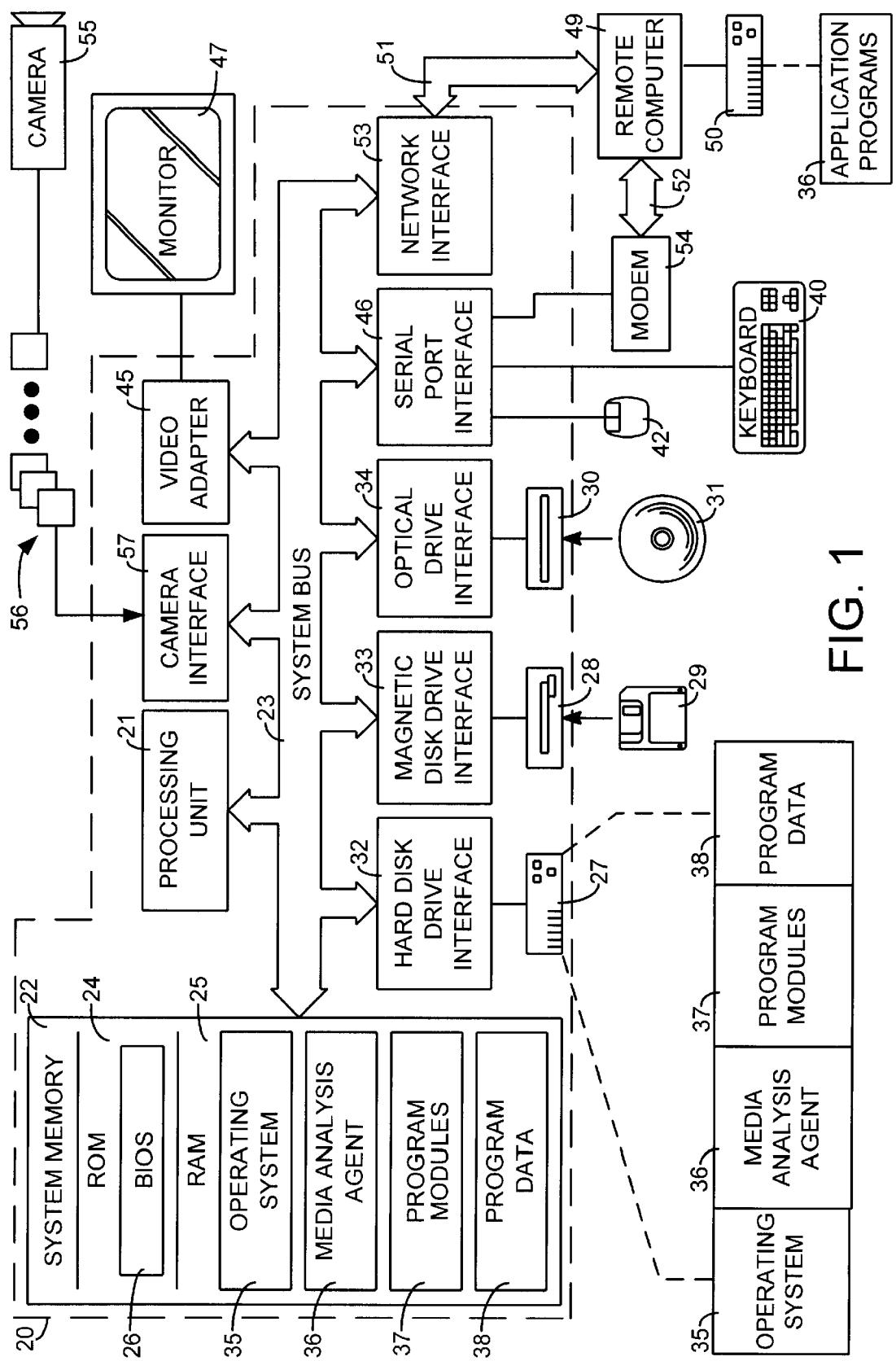
FIG. 1 is a block diagram of an example computing system that may be used to implement aspects of the present disclosure.

FIG. 1 and the following discussion are intended to provide a brief, general description of a suitable computing environment in which the invention described herein may be implemented. In accordance with the illustrated example embodiment, the computing system 20 of FIG. 1 includes an innovative media analysis agent 36, which analyzes media content while in the compressed digital domain to identify and track objects comprising the media content, thereby facilitating a whole host of content-based multimedia applications. As alluded to above, the innovative media analysis agent 36 may well be embodied in hardware and/or a series of computer executable instructions, such as program modules, being executed by a computing system, such as a personal computer 20. Generally, program modules include instructions, routines, programs, objects, components, data structures, and the like that perform particular tasks or implement particular abstract data types. Moreover, those skilled in the art will appreciate that the invention may be practiced with other computing system configurations, including hand-held devices, multiprocessor systems, microprocessor-based or programmable consumer electronics, network person computers, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an exemplary system for implementing the invention includes a general purpose computing device in the form of a computing system, such as a personal computer 20 including one or more processing unit(s) 21, a system memory 22, and a system bus 23 that couples various system components including the system memory to the processing unit 21. The system bus 23 may be any of several types of bus structures including a memory bus, or memory controller; a peripheral bus; and a local bus using any of a variety of bus architectures.

Preferably, the system memory includes read only memory (ROM) 24 and random access memory (RAM) 25. A basic input/output system 26 (BIOS), containing the basic routine that helps to transfer information between elements within the personal computer 20, such as during start-up, is stored in the ROM 24. The personal computer 20 further includes a secondary storage device, such as a hard disk drive 27 for reading from and writing to a hard disk, not shown, a magnetic disk drive 28 for reading from or writing to a removable magnetic disk 29, and an optical disk drive 30 for reading from or writing to a removable optical disk 31, such as a compact disk (CD) ROM, digital versatile disk (DVD) ROM, or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computing system 20. Although the exemplary environment described herein employs a hard disk, a removable magnetic disk 29, and a removable optical disk 31, it should be appreciated by those skilled in the art that other types of computer readable media that can store data that is accessible by a computer, such as magnetic cassettes, flash memory cards, digital video disks, CDs, DVDs, random access memories (RAMs), read only memories (ROMs), and the like, may also be used in the exemplary operating environment.

A number of program modules may be stored on the hard disk, magnetic disk 29, optical disk 31, ROM 24, or RAM 25, including an operating system 35, the innovative media analysis agent 36, other program modules 37, and program data 38. As will be described in greater detail below, the innovative media analysis agent 36 analyzes digitally compressed media to identify objects within image frames of the compressed media. As introduced above, the accurate identification of objects facilitates a whole host of interactive multimedia applications; by performing such analysis in the compressed digital domain, media analysis agent 36 is able to reduce the storage and processing requirements associated with such identification, freeing these valuable resources for other applications.

A user may enter commands and information into the computing system 20 through input devices, such as a keyboard 40 and a pointing device 42, such as a mouse. The computing system 20 might also include a camera 55, such as a digital/electronic still or video camera, or film/photographic scanner, capable of capturing a sequence of images 56. The images 56 are input into the computing system 20 via an appropriate camera interface 57. This camera interface 57 is connected to the system bus 23, thereby allowing the images to be routed to and stored in the RAM 25, or one of the other data storage devices associated with the computing system 20. However, it is noted that image data can be input into the computing system 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A display device, such as a monitor, 47 is also connected to the system bus 23 via an interface, such as a video adapter 48. In addition to the monitor, personal computers typically include other peripheral output devices (not shown), such as speakers and printers.

The computing system 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computing system 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets, and the Internet. In this regard, computing system 20 may also receive compressed media content from a remote computing system (e.g., computing system 49) via the network 51.

When used in a LAN networking environment, the computing system 20 is connected to the local network 51 through a network interface or adapter 53. When used in a WAN networking environment, the computing system 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computing system 20, or portions thereof, may be stored in the remote memory storage device. It will be appreciated that the network connections shown are exemplary and other means of establishing a communications link between the computers may be used.

Example Media Analysis Agent

Figure 2:
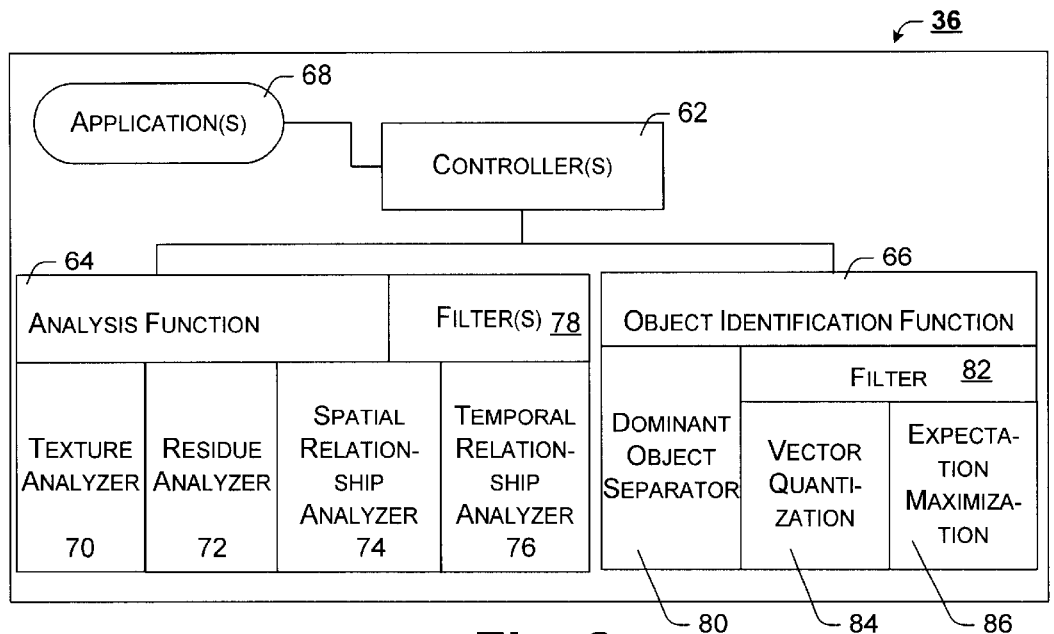
FIG. 2 is a block diagram of an example media analysis agent, according to one embodiment of the present disclosure.

FIG. 2 illustrates a block diagram of an example media analysis agent 36 incorporating the teachings of the present invention, according to one implementation of the invention. In accordance with the illustrated example embodiment of FIG. 2, media analysis agent 36 is depicted comprising one or more controller(s) 62, a macroblock analysis function 64, and an object identification function 68, each operatively coupled as shown. As introduced above, media analysis agent 36 object identification capability facilitates a whole host of applications such as, e.g., content-based search and retrieval applications. In certain implementations, such applications may well be integrated within analysis agent 36 as applications 70, as illustrated in FIG. 2.

As will be discussed in greater detail below, the macroblock analysis function 64 analyzes various attributes (e.g., texture and coding residuals, spatial information, temporal information) of the compressed media content, and generates one or more confidence factors (or measure) associated with the motion vector(s) of an image frame. This information is used by object identification function 68 to identify a dominant and subordinate objects in the multimedia image frame. Unlike prior art media analysis agents, media analysis agent 36 does not decompress the received compressed multimedia to facilitate analysis and object identification. Rather, as introduced above, media analysis agent 36 analyzes media content while in the compressed digital domain, thereby reducing the storage and computational requirements associated with the object identification.

According to one implementation, controller(s) 62 receives compressed multimedia content from a higher-level application (e.g., media decoder, rendering application, or the like), or peripheral (e.g., multimedia accelerator) for analysis. In response, controller(s) 62 selectively invoke one or more of the analysis 64 and/or identification 66 functions to identify objects within the compressed multimedia content. According to one implementation, controller(s) 62 receives one or more motion vector confidence indicators from macroblock analysis function 64 and combines them to generate a single motion vector confidence measure according to the following equation:

$$C_{mv} = A \cdot I_1 + B \cdot I_2 + C \cdot I_3 + \ldots \qquad \text{Eq. 1}$$

In equation 1, A, B and C are weighting values applied to the individual indicator scores $I_1$, $I_2$, $I_3$. According to one implementation, the weighting applied to each of the confidence measures received from macroblock analysis function 64 is dependent on the total number of confidence measures received. In other instances, the weighting applied to each of the received confidence measures is fixed based, at least in part, on the relative quality of the received confidence measure.

Once controller 62 has generated a motion vector confidence measure from the received indicator(s), object identification function 66 is selectively invoked to identify objects within the compressed image frame. Controller 62 stores and tracks the identified objects across image frames, facilitating the content-based applications (e.g., 70) discussed above. But for the innovative aspects of the invention, described above, controller(s) 62 is intended to represent any of a wide variety of control logic known in the art such as, for example, a processor, an application specific integrated circuit (ASIC), a field programmable gate array (FPGA), a programmable logic array (PLA), and the like. Moreover, it should be appreciated that controller(s) 62 may well be implemented in software as a plurality of executable instructions which, when executed (e.g., by processing unit 21), implement the control functions described above.

Macroblock analysis function 64 receives media content from controller(s) 62 in the compressed digital domain, analyzes one or more aspects of the compressed, digital media to generate a confidence indicator of the motion vectors for each macroblock (i.e., a 16×16 pixel blocks of the image frame). As shown, macroblock analysis function 64 includes a texture analyzer 70, a coding residue analyzer 72, a spatial information analyzer 74 and a temporal information analyzer 76, each of which will be described in greater detail below. According to one implementation, the texture and coding residue analyzers (70 and 72) generate a single confidence indicator ($I_1$), which is combined with confidence indicators ($I_2$ and $I_3$) generated by the spatial relationship analyzer 74 and temporal relationship analyzer 76, respectively. It is to be appreciated that greater or fewer confidence indicator(s) may well be generated and combined in alternate ways without deviating from the spirit and scope of the present invention.

Texture analyzer 70 is selectively invoked to analyze the texture of intra-encoded (I) frames, and to interpolate the texture of inter-encoded frames (e.g., bi-directionally interpolated predicted (B) frames and predicted (P) frames) using an inverse motion compensation technique. According to one implementation, the texture of a frame is measured by the AC (i.e., higher frequency) coefficients of each macroblock of an image frame. Texture is an important measure of motion compensation accuracy in that during the encoding process, the encoder uses texture to find and encode motion vectors. As a result, low-textured blocks of a particular frame are more likely to have incorrectly coded motion vectors contained therein. Therefore, the amount of texture in a given block provides an indication as to how likely a particular motion vector is the true motion vector for the particular block within the frame.

Although texture information is not readily available for macro-blocks of inter-encoded frames (B and P frames), texture analyzer 70 derives such information using an inverse motion compensation process. According to this example implementation, the AC coefficients for macroblocks of a B or P frame are derived by inverse motion compensation of corresponding macro-blocks from an anchor frame (e.g., preceding I frame). Since the resultant macro-block could overlap with four other DCT blocks in the I-frame, texture analyzer 70 averages the energy from all four blocks.

Coding residue analyzer 72 is selectively invoked to analyze inter-encoded frames (e.g., B and P frames) and, more specifically, to identify DC residuals created during the encoding process. The DC residual value provides an indicator of how well motion is compensated. Thus, a high DC residual value is indicative of a poor motion vector.

Given the AC and DC coefficients obtained from texture analyzer 70 and coding analyzer 72, macroblock analysis function 64 generates a first confidence indicator ($I_1$). According to one implementation, macroblock analysis function 64 generates the indicator according to equation 2, below.

$$I_1 = AC + k(1/DC) \quad \text{Eq. 2}$$

In equation 2, above, AC represents the AC coefficient(s), while DC represents the DC coefficient(s). Insofar as the expected AC and DC coefficients may vary in orders of magnitude, a normalization factor (k) may be used to equalize the effect of the coefficients on the resultant confidence indicator.

Spatial analyzer 74 is selectively invoked to analyze the magnitude and/or direction of a motion vector in relation to the motion vector in neighboring macro-blocks. If a motion vector is largely out of sync in either magnitude and/or direction with its neighbors, it is an indicator of a possible outlier motion vector (i.e., an inaccurate motion vector). To analyze this spatial relationship, spatial analyzer 74 generates an average direction and magnitude of surrounding macroblocks, and measures the difference of the current magnitude/angle with the identified average magnitude/angle. According to one implementation, the lower the deviation of the current magnitude/angle from the average magnitude/angle, the higher the spatial confidence indicator ($I_2$). According to one implementation, the magnitude and direction elements of the spatial confidence indicator ($I_2$) are mathematically represented by the equations (3,4) below.

$$Mag_{i,j} = 100 - 100 * \frac{\left| M_{i,j} - \frac{1}{N} * \sum_{k,l}^{\Theta} M_{k,l} \right|}{\frac{1}{N} * \sum_{k,l}^{\Theta} M_{k,l}} \quad \text{(Eq. 3)}$$

$$Dir_{i,j} = 100 - 100 * \frac{\left| D_{i,j} - \frac{1}{N} * \sum_{k,l}^{\Theta} D_{k,l} \right|}{2\pi} \quad \text{(Eq. 4)}$$

where: $\Theta$ is the structural element set that defines neighborhood motion vectors;

N is the number of elements in the set $\Theta$;

$M_{ij}$ is the magnitude of motion vector at block (i,j); and $D_{ij}$ is the direction of the motion vector at block (i,j), defined measured as a tan $2(MV_y, MV_x)$.

Temporal relationship analyzer 76 analyzes the temporal relationship of a macroblock motion vector from one frame to another. A good motion vector should not have its direction altered in a drastic measure from one frame to the next. That is, in most instances, object movement from one frame to the next is gradual, and drastic changes represent an inaccurate motion vector. According to one implementation, temporal relationship analyzer 76 generates a temporal confidence indicator ($I_3$) by measuring the directional change in motion vector across a number (N) of frames. According to one implementation, the temporal confidence indicator ($I_3$) is inversely proportional to the identified deviation in motion vector direction.

In addition to the foregoing, macroblock analysis function 64 includes filter(s) 78 to smooth spatial and temporal holes left by removing identified "outlier" motion vectors. That is, once controller(s) 62 (and/or macroblock analysis function) generates the confidence measure for each of the macroblocks in an analyzed image frame, controller(s) 62 (and/or macroblock analysis function 64) removes those macroblocks whose motion vector confidence measure does not meet a minimum threshold. The removal of such macroblocks leaves holes in an otherwise contiguous motion field. Thus, one or more filters 78 are utilized to smooth out the motion fields. According to one implementation, a box filter and/or a median filter are utilized to smooth spatial incongruities. According to this implementation, the temporal filter utilized depends on the type of frame encountered. Regardless of the filter used, the holes are filled with macro-block data interpolated from surrounding macroblocks.

For certain frame types, it is desirable to place an emphasis on the immediate frame (e.g., B-frame), while for other frames it is desirable to place an emphasis on temporally adjacent frames (e.g., P-frame). According to one implementation, a 1-2-1 temporal filter is utilized for B-frames, a 1-1-temporal filter is applied for P-frames, while a 1-0-1 temporal filter is applied for I-frames. It is to be appreciated that any of a number of alternate filters may well be used without deviating from the spirit and scope of the present invention. In this regard, any of a number of morphological filters in spatial part and of course different coefficients for all filters is possible.

Object identification function 66 identifies dominant and subordinate objects in a compressed image frame based, at least in part, on the confidence measure(s) generated from the confidence indicators. As shown, object identification function 66 includes a dominant object separator 80 and one or more filters 82 including, for example, vector quantization filter 84 and expectation maximization filter 86. Once the compressed motion field has been cleaned from outliers, the dominant object separator 80 is selectively invoked to find how the dominant motion layer moves in a frame. According to one implementation, dominant object separator 80 utilizes a recursive linear least-square based outlier rejecting algorithm, utilizing the confidence measure generated above. It should be appreciated that, by identifying the dominant motion layer a "mask" is created to enable dominant object separator 66 to identify subordinate objects within the image frame.

Once dominant object separator 66 has identified the dominant motion layer, additional filter(s) 82 are applied to further separate and segment other objects in the image field. In accordance with the illustrated example embodiment, filters 82 include a vector quantization filter 84 and an expectation maximization filter 86 to separate out objects and calculate their own affine models (loosely defined as a trajectory, or motion path for the objects). The vector quantization filter 84 is a hard clustering technique that considers only spatial adjacency to cluster objects out of the object mask. The expectation maximization filter 86 is a soft way to cluster as it also considers the motion model coherence between spatially different objects.

Once the objects are identified, controller(s) 62 stores the objects and their associated affine models to track objects across frames. According to one implementation, tracking objects across frames is accomplished by finding matches to the object in a current frame by its average DC color metric and its affine model to the next frame. In one implementation various attributes of an object is stored such as, for example, an objects appearing length, its average size and the two-dimensional location and motion and color information in the video frame. It is to be appreciated that such information greatly facilitates any content-based search and retrieval applications.

Given the foregoing, it is to be appreciated that media analysis agent may well be implemented in a number of alternate embodiments. According to one implementation, media analysis agent 36 is implemented in software as a stand-alone application, as a subset of a higher-level multimedia application such as, for example, a media decoder application, a media rendering application, a browser application, a media player application, and the like. Alternatively, media analysis agent 36 may well be implemented in hardware, e.g., in an application specific integrated circuit (ASIC), a controller, a programmable logic device (PLD), in a multimedia accelerator peripheral, and the like. Such alternate implementations are anticipated within the scope and spirit of the present invention.

Those skilled in the art will appreciate that compressed domain video structure is often contaminated with mismatches, misalignment, and other types of computational noise. This contamination makes it difficult to extract a motion object with any degree of accuracy. The approach described herein uses the aforementioned confidence measures to filter out such noise, thereby enabling object identification function 66 to identify dominant and subordinate objects from the compressed video image, facilitating content-based applications.

Example Video Frame Sequence

Figure 3:
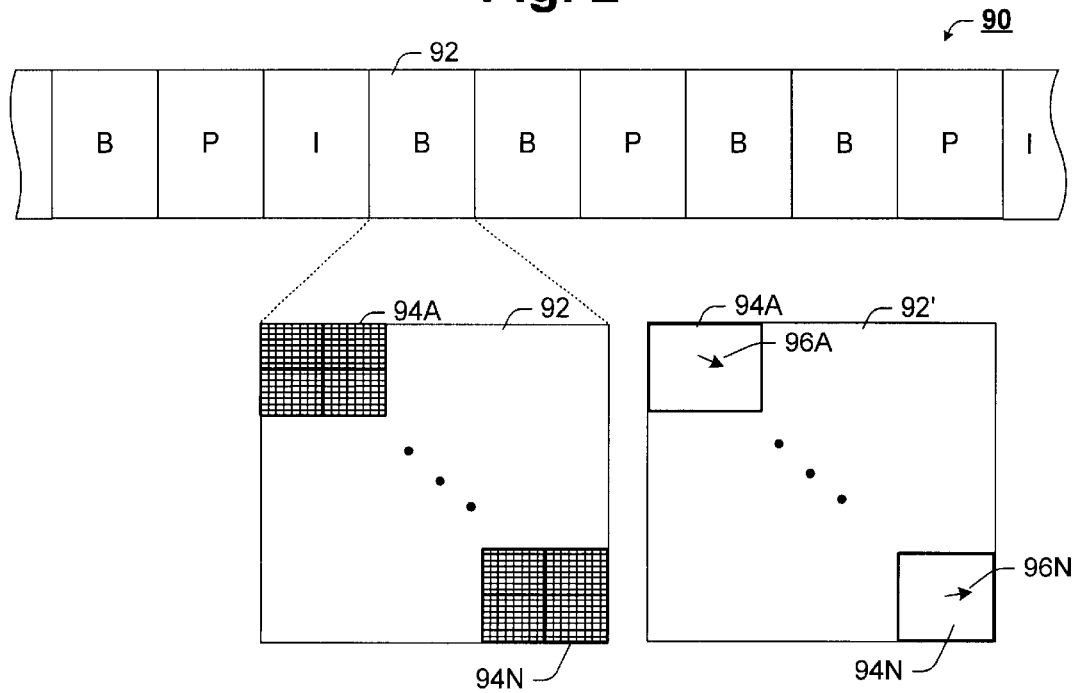
FIG. 3 is a graphical representation of a group of pictures denoting coding dependencies for motion estimation, highlighting the macroblocks of a frame and the resultant motion vectors for the macroblocks.

FIG. 3 illustrates an example video frame sequence (also referred to as a group of pictures (GOP). As shown, the sequence of image frames 90 is comprised of intra-encoded (I) frames as well as inter-encoded frames such as, for example, the bi-directionally interpolated predicted (B) frames, and predicted (P) frames. As discussed above, each of the frames are comprised of picture elements, or pixels. To reduce the amount of data, it is common for a video encoder to analyze and compress an image frame on a macro-block level (i.e., 16×16 pixels of luminance information), with two additional 8×8 blocks of chrominance information. The macro-blocks 94 comprising an image frame are further illustrated with reference to image frame 92. The number of macro-blocks 94A–94N comprising an image frame 92 depends on the resolution of the base image. In one embodiment, for example, 120×45 macro-blocks are utilized to encode 1920×1080 pixels. Once encoded, each macroblock 94A–94N of an inter-encoded frame (B or P frame) includes a motion vector, graphically represented in the illustrated example embodiment of FIG. 3 by arrows 96A–96N, respectively.

Example Operation and Implementation

Given the above example operating environment, the remaining part of this description section will describe an example method of operation of the innovative media analysis agent 36. More specifically, for ease of illustration, the example method of operation depicted in FIG. 4 will be developed with continued reference to FIGS. 1 through 3, and further reference to FIGS. 5–13. In general, the present disclosure describes an approach to extracting motion object (s) or a motion field(s) from a compressed domain image structure by accurately estimating and smoothing the motion object or motion field using confidence measures based on discrete cosine transformation (DCT) coefficients, spatial, and temporal continuity of motion. This approach has advantages including lower processing overhead, lower storage capacity needs, and complexity reduction.

Figure 4:
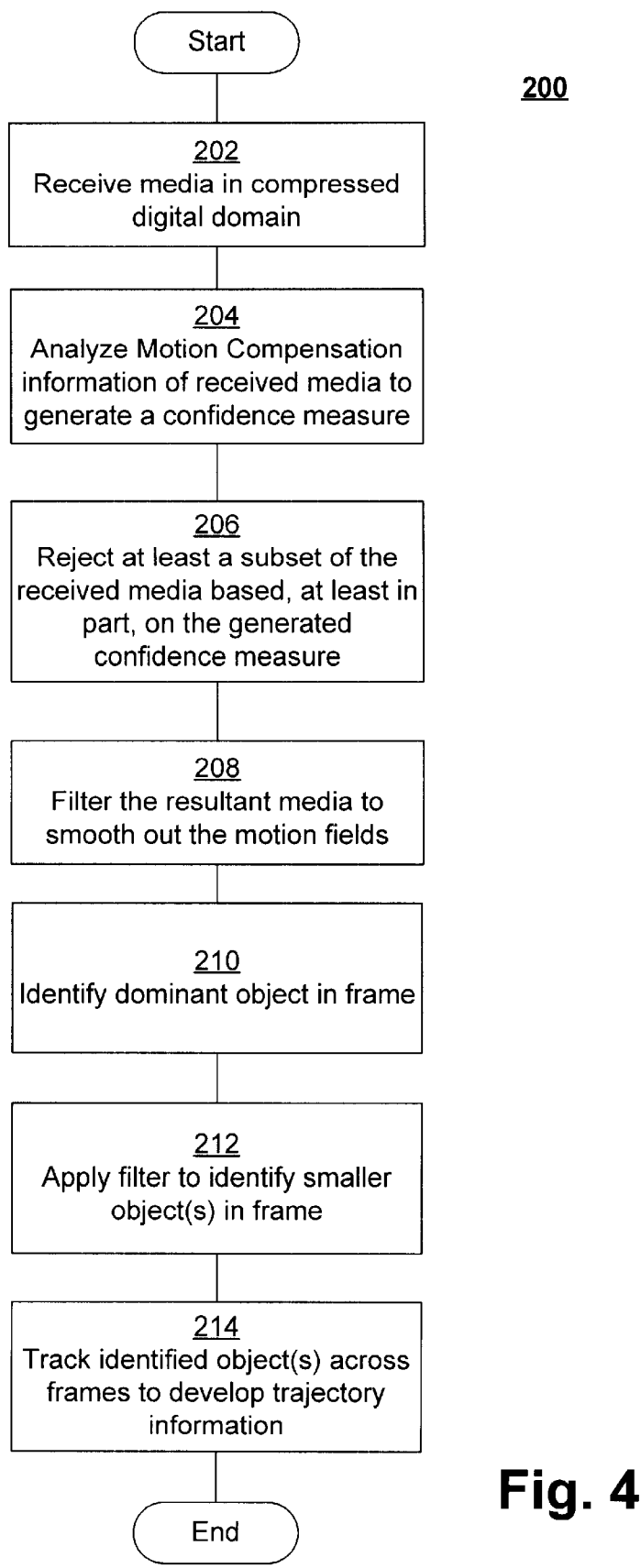
FIG. 4 is a flow chart of an example method for analyzing media content in a compressed digital domain, in accordance with the teachings of the present disclosure.

FIG. 4 illustrates a flow chart of an example method for analyzing media content in the compressed digital domain, in accordance with the teachings of the present invention. As shown, the method 200 begins with block 202 wherein media analysis agent 36 receives media in the compressed digital domain. In block 204, controller(s) 62 selectively invoke an instance of macroblock analysis function 64 to analyze motion compensation information of the received media to generate a confidence measure. More specifically, as described above, one or more of texture analyzer 70, residue analyzer 72, spatial relationship analyzer 74 and/or temporal relationship analyzer 76 are invoked to generate confidence indicators from analysis of various image frame attributes. Controller(s) 62 receive one or more confidence indicators from macroblock analysis function 64 and generates the confidence measure therefrom.

In block 206, controller(s) 62 rejects at least a subset of the macro-blocks comprising the image frame based, at least in part, on the generated confidence measure. According to one implementation, a threshold confidence measure is dynamically generated based on the confidence measures calculated for all of the macro-blocks comprising the image frame. Those macroblocks that do not meet the minimum threshold confidence measure are eliminated from the analysis. In alternate embodiments, the threshold confidence measure is a static value, determined prior to analysis of any image frames.

In block 208, controller(s) selectively invoke one or more filters 78 to smooth the resultant image frame. As introduced above, filter(s) 78 smooth the holes left by the eliminated macro-blocks of the image frame. According to one implementation, spatial and temporal filters are employed.

In block 210, a dominant object layer is identified within the image frame. More specifically, as described above, controller(s) 62 selectively invokes an instance of the dominant object separator 80 of object identification function 66 to identify the dominant object. The dominant object separator 80 utilizes the well-known recursive linear least-square based outlier rejecting algorithm to identify the dominant object layer.

In block 212, once the main object has been identified, additional filtering is performed to further identify subordinate objects. According to one implementation, introduced above, object identification function 66 selectively invokes a vector quantization filter 84 and/or an expectation maximization filter 86 to further identify subordinate objects within the compressed image frame.

In block 214, once the main and subordinate objects have been identified, controller 62 tracks identified object(s) across frames, thereby facilitating a whole host of content-based search and retrieval applications. As introduced above, controller(s) 62 track the identified objects by color, size and a developed affine model for each of the objects. According to one implementation, the color, size and affine models are stored in local memory to facilitating the higher-level content based search and retrieval applications.

Figure 5:
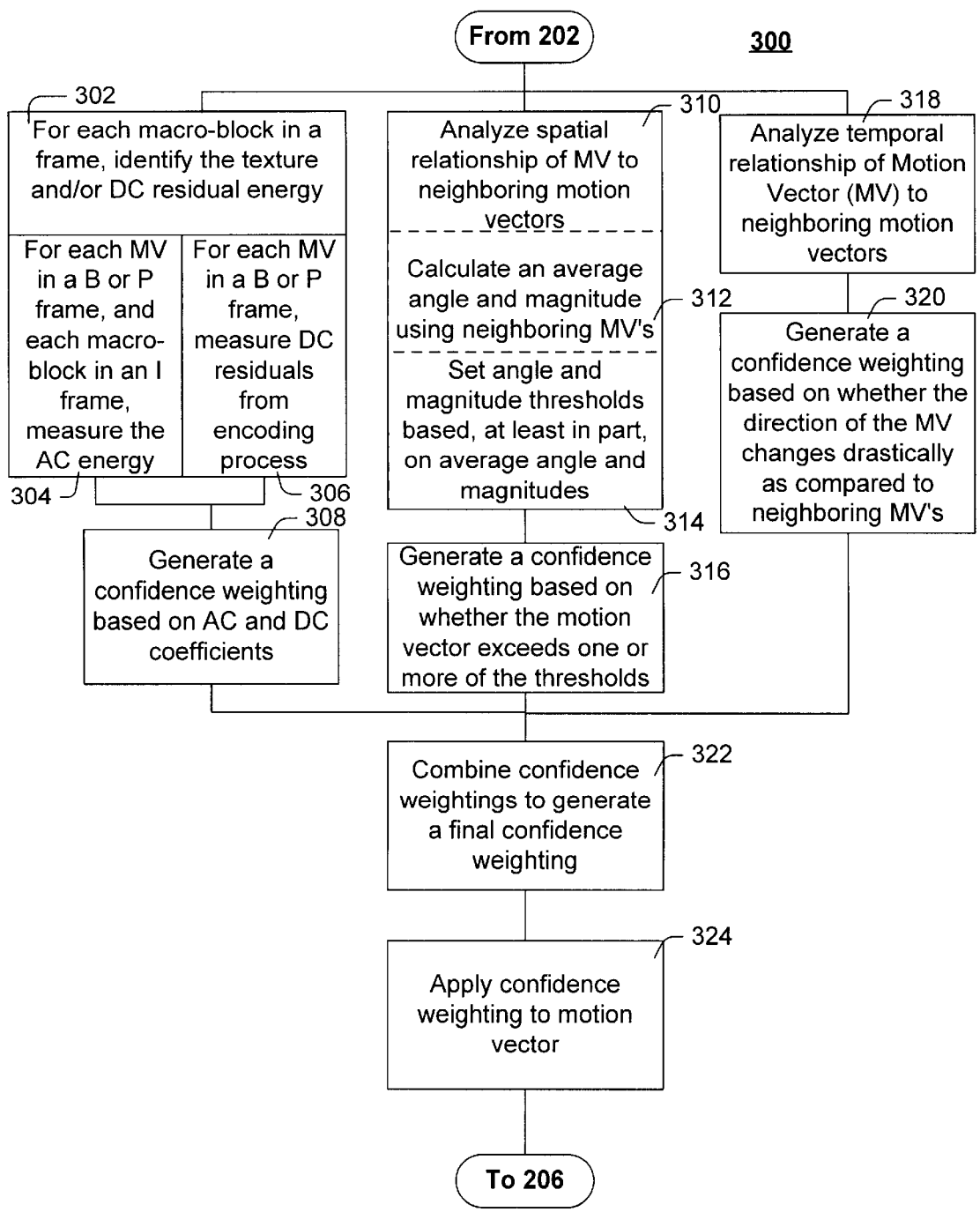
FIG. 5 is a flow chart of an example method for analyzing the motion compensation information of compressed media to generate a confidence measure, according to one aspect of the present invention.

Having introduced the innovative analysis and identification features of media analysis agent 36, above, FIG. 5 illustrates a flow chart of an example method of generating a confidence measure of the motion vectors for each macroblock of an image frame. As shown, confidence indicators from a number of analysis functions (e.g., texture analyzer, residue analyzer, spatial relationship analyzer and temporal relationship analyzer) may be generated in parallel—thus the parallel paths. That is, controller(s) 62 may selectively invoke one or more of the analysis functions independently and simultaneously.

For purposes of illustration only, the method begins with block 302, wherein the texture and residue analyzers 70 and 72, respectively, are invoked to identify the texture and DC residues for each macro-block in a frame. As introduced above, for each motion vector in a inter-encoded frame (B or P frame), and for each macro-block in an I-frame, texture analyzer 70 measures the AC energy coefficients to generate a measure of texture, block 304. As discussed above, the texture information for the inter-encoded frames are interpolated from the texture information of corresponding macro-blocks in the anchor (I) frame. In addition, for each macro-block in an inter-encoded frame, the DC residuals from the encoding process are measured by residue analyzer 72 as a measure of motion vector accuracy, block 306. From the AC and DC coefficients, controller(s) 62 (and/or macroblock analysis function 64) generate a first confidence indicator ($I_1$) from which the final confidence measure will be generated.

In parallel beginning with block 310, spatial analyzer 74 is invoked to analyze the spatial relationship of the motion vector to neighboring motion vectors within the same frame. More specifically, spatial analyzer 74 calculates an average motion vector angle and magnitude using the motion vectors from surrounding macro-blocks within the same image frame, block 312. In block 314 spatial analyzer 74 sets motion vector angle and magnitude thresholds based, at least in part, on the calculated average angle and magnitude information. In block 316, spatial analyzer 74 generates a confidence indicator ($I_2$) based on the deviation of the current motion vector's angle and magnitude from that of the calculated thresholds.

Along another parallel path beginning with block 318, controller(s) 62 selectively invokes temporal analyzer 76 to analyze the temporal relationship of a current motion vector of a particular macro-block across multiple (N) image frames. As introduced above, temporal relationship analyzer 76 quantifies deviations in the direction and magnitude of a motion vector across image frames, wherein the confidence indicator ($I_3$) generated by temporal analyzer 76 is inversely proportional to the amount of change in the motion vector across image frames, block 320.

In block 322, controller(s) 62 receives the one or more confidence indicator(s) $I_1$, $I_2$, $I_3$, . . . and combines the confidence indicators to generate a final confidence measure in each of the motion vectors. In block 324, controller(s) 62 applies the confidence measure to the motion vectors and identifies potential motion vector outliers, which are then removed from the image frame prior to invocation of the object identification function 66, discussed above.

Example Application of Media Analysis Agent to a Video Frame

It will be appreciated, given the foregoing, that the present invention provides an innovative method of analyzing media content to identify and track objects while in a compressed digital domain representation. With continued reference to the architectural and operational illustrations of FIGS. 1–5, FIGS. 6–11 are provided to graphically illustrate the analysis on a compressed image frame.

Figure 6:
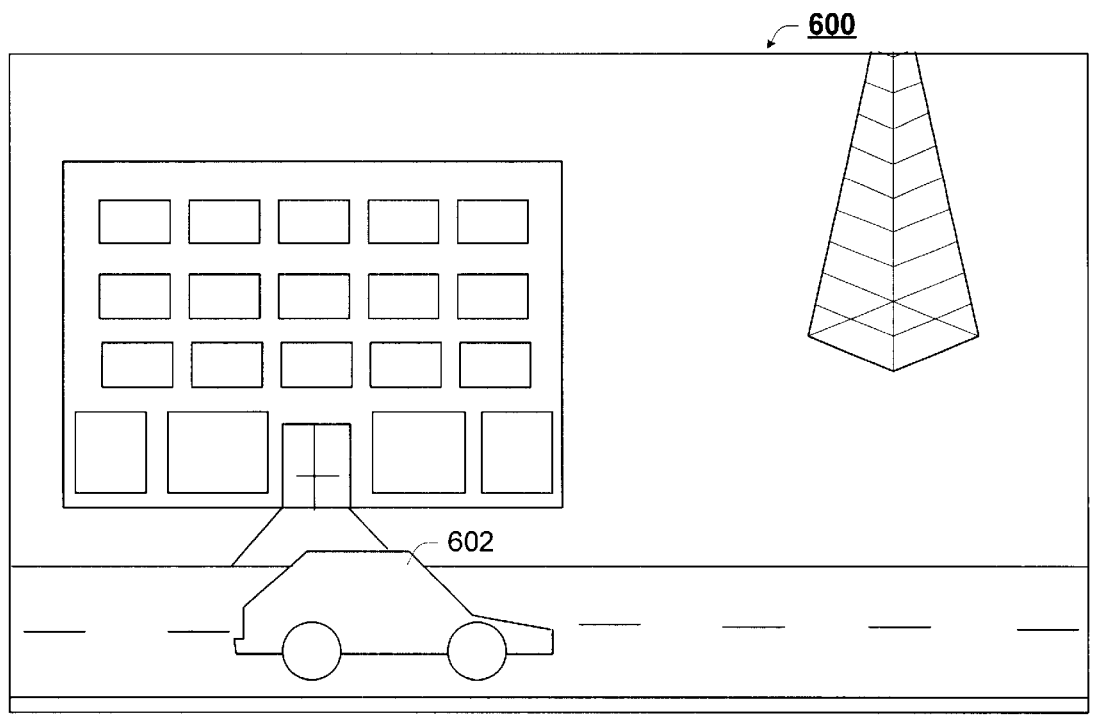
FIGS. 6–11 are graphical illustrations of media analysis agent identifying a dominant object within media data in the compressed, digital domain, according to one example embodiment of the present invention.

FIG. 6 graphically illustrates an example image frame 600 depicting a car 602 located on a street, with several buildings and an electrical tower also in the image frame. Although not evident from a single frame, the car 602 is moving along the street and, as such, represents the dominant moving object within the image frame. Although media analysis agent will analyze the media data in the compressed, digital domain (as provided above), FIG. 6 is presented in a decompressed form to enable the reader to better understand the content of the image frame.

Figure 7:
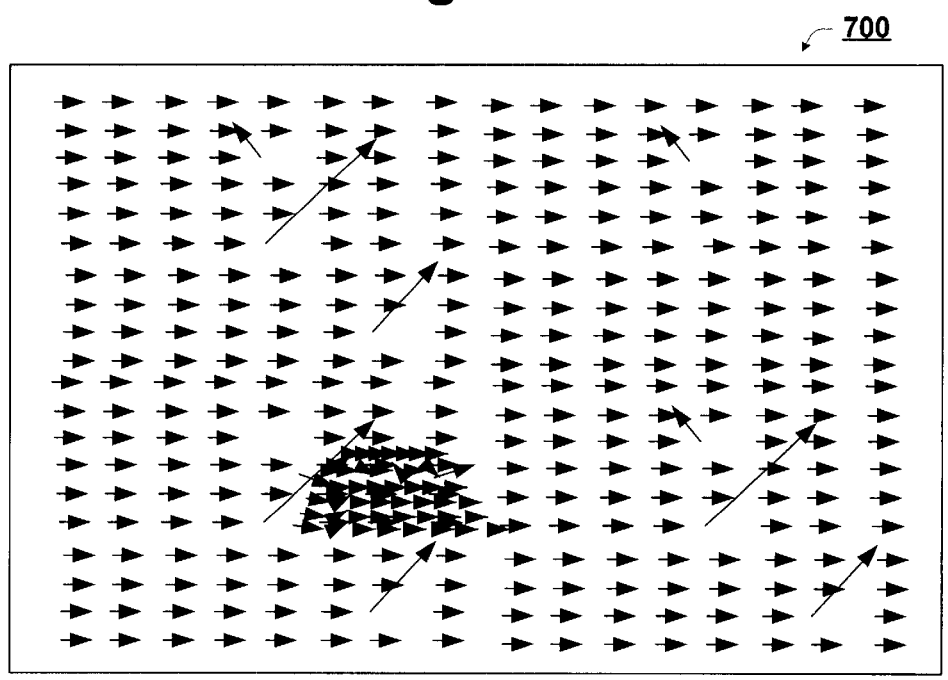

FIG. 7 graphically illustrates the image frame in the compressed, digital domain, wherein the image frame is comprised of a number of blocks (or macroblocks), each represented in FIG. 7 with an associated motion vector. In this regard, FIG. 7 represents the image frame in the form facilitating the analysis of media analysis agent 36. As introduced above, media analysis agent 36 analyzes the image frame of FIG. 7 block by block to generate a confidence measure associated with the motion vector of each block.

Figure 8:
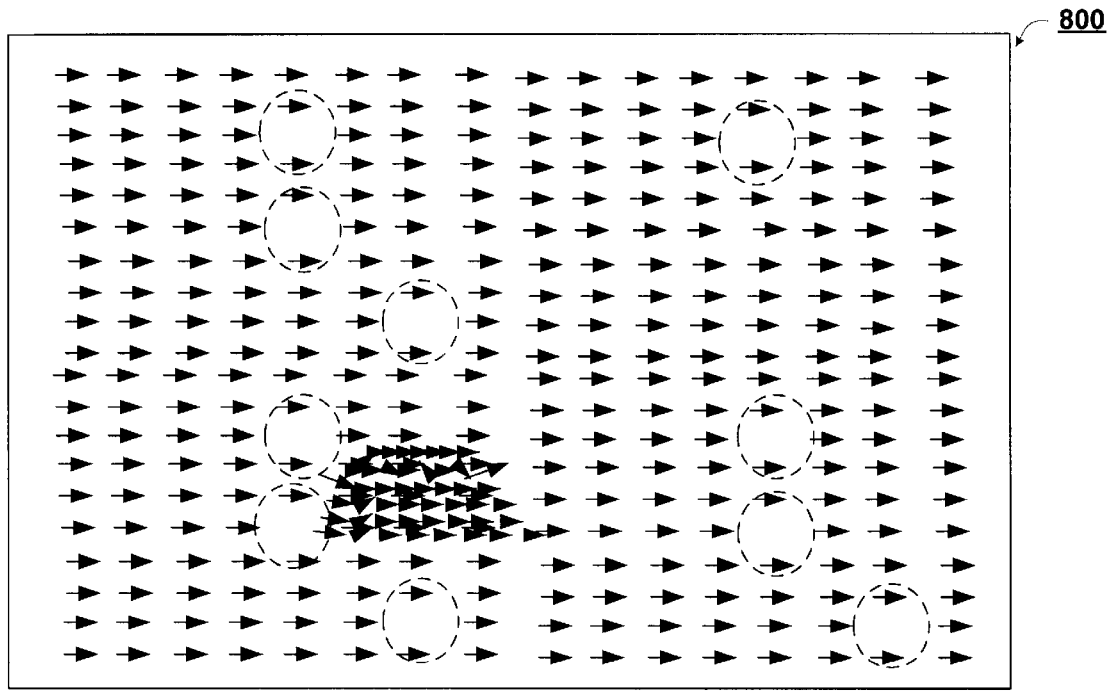

Once the confidence measures are generated, media analysis agent eliminates those blocks identified to have an outlier (or unreliable) motion vector. FIG. 8 illustrates the image frame once the blocks containing outlier motion vectors have been eliminated from the image frame.

Figure 9:
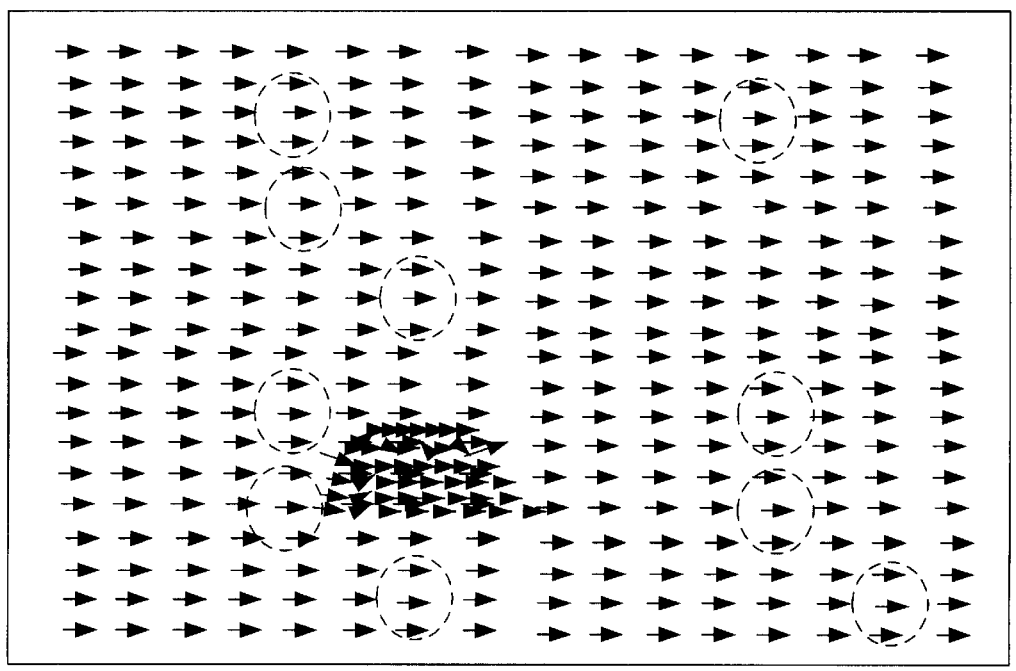

FIG. 9 illustrates the image frame once media analysis agent has filtered and normalized the image frame, using the interpolation techniques discussed above. More particular, the missing blocks are filled in using media data developed by media analysis agent by interpolating neighboring data (e.g., a smoothing technique). Spatial and temporal filters are applied to further refine the image.

Figure 10:
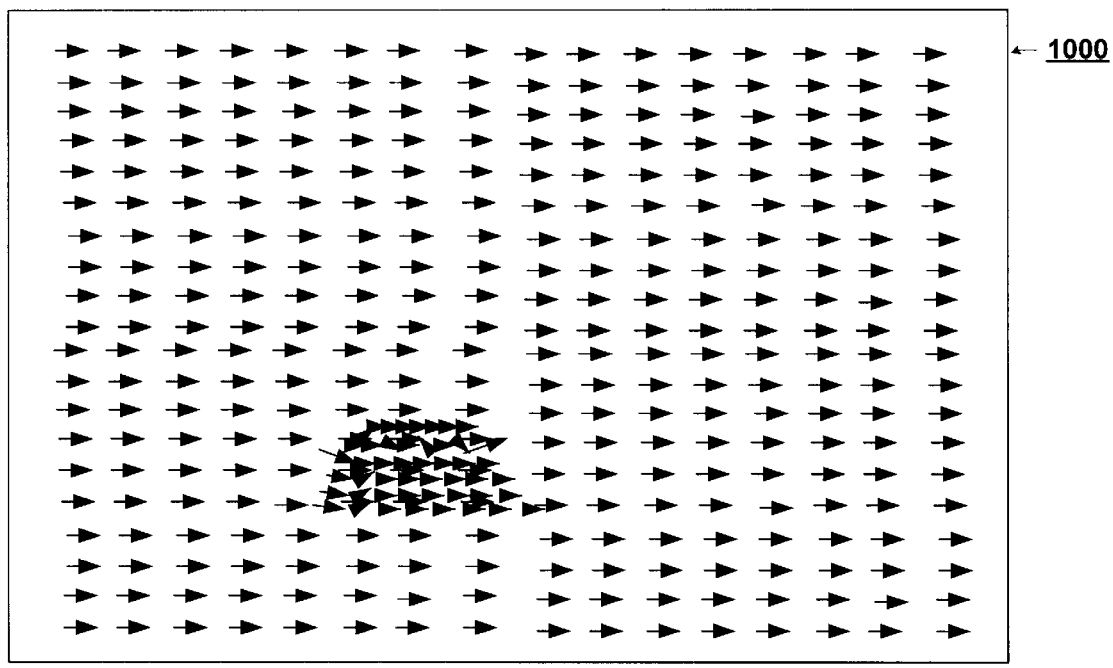

FIG. 10 illustrates the image frame once the interpolation and filtering processes have been performed. By FIG. 10, the dominant object separation of the car is apparent from the denoted motion vectors. As introduced above, media analysis agent 36 identifies the dominant object at this point, and develops a mask.

Figure 11:
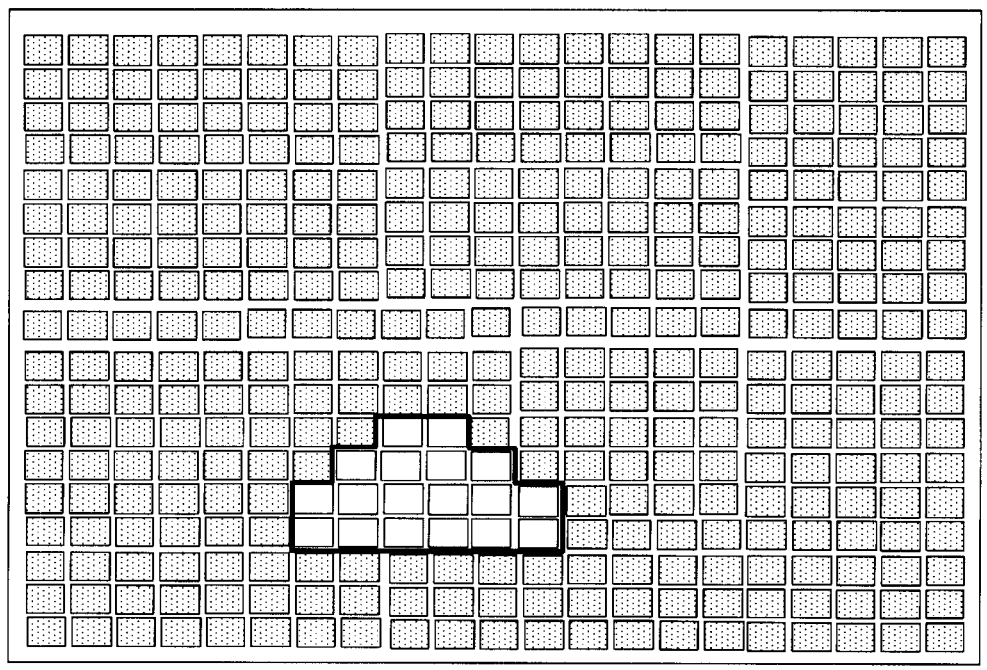

FIG. 11 represents the image frame once the dominant object mask has been identified. Media analysis agent 36 develops an affine model for the dominant object, facilitating tracking of the identified dominant object through successive image frames. Once the dominant object mask has been applied, further iterations of the innovative process can be invoked to identify other objects within the image frame, if desired.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method comprising:
   receiving media data in a compressed, digital domain;
   analyzing motion vectors associated with the received media data while in the compressed, digital domain; and
   identifying one or more objects in the received media data based, at least in part, on the motion vector analysis.

2. A method according to claim 1, further comprising:
   extracting one or more dominant objects from the one or more identified objects.

3. A method according to claim 1, further comprising:
   developing an object mask for each of the identified objects; and
   extracting one or more dominant objects from the one or more identified objects in the received media data utilizing the developed object mask(s).

4. A method according to claim 1, wherein analyzing the motion vectors comprises:
   characterizing one or more blocks of media data within each frame of media data;
   generating one or more indicators denoting how well motion is compensated in the one or more blocks of media data; and
   generating a confidence measure in the motion vector of each block based, at least in part, on the generated indicators.

5. A method according to claim 4, wherein characterizing one or more blocks of media data comprises:
   measuring one or more attributes in and between each block comprising a media data frame.

6. A method according to claim 5, wherein the one or more attributes comprise one or more of a spatial consistency of motion vectors between neighboring blocks within a frame, a temporal consistency of motion vectors of blocks between neighboring frames, and a texture and residue measure within a frame.

7. A method according to claim 4, wherein generating the confidence measure comprises:
   weighting each of the one or more generated indicators; and
   summing the weighted indicators to generate the confidence measure.

8. A method according to claim 4, further comprising:
   filtering out mismatched media data based on the confidence measures, creating gaps in the compressed media data;
   filling in the gaps in the compressed media data by interpolating between surrounding media data; and
   separating a dominant video object from the compressed media data.

9. A method according to claim 8, wherein filtering out mismatched media data is performed utilizing a recursive linear least-square based outlier rejecting algorithm.

10. A method according to claim 1, further comprising:
    developing an affine model for at least one of the identified objects of the compressed media.

11. A method according to claim 10, further comprising:
    tracking movement of the at least one object across image frames based, at least in part, on the developed affine model.

12. A storage medium comprising a plurality of executable instructions including at least a subset of which that, when executed, implement a method according to claim 1.

13. A system comprising:
    a storage device including a plurality of executable instructions; and
    a controller, coupled to the storage device, to execute at least a plurality of the executable instructions to implement a method according to claim 1.

14. A method for tracking objects within media data in a compressed, digital domain, the method comprising:
    generating one or more confidence measures from a corresponding one or more attributes of the media data while in the compressed, digital domain; and
    identifying one or more objects within the compressed media data based, at least in part, on the one or more generated confidence measures; and
    developing an affine model for at least one of the one or more identified objects in the compressed media data to facilitate tracking of the at least one or more identified objects.

15. A method according to claim 14, wherein the one or more attributes include a measure of spatial consistency of motion vectors between neighboring blocks within a frame, temporal consistency of motion vectors of blocks between neighboring frames, and/or texture and residue within a frame.

16. A method according to claim 14, wherein the confidence measure(s) denote motion vector accuracy for blocks within an image frame.

17. A method according to claim 14, wherein identifying one or more objects comprises:
    filtering out mismatched blocks from the compressed media data based on the confidence measures;
    smoothing resultant media by interpolating motion vector information from neighboring blocks; and
    separating a dominant object from other objects based, at least in part, on resultant motion vector information.

18. A method according to claim 17, wherein separating the dominant object is performed using a recursive least-square based outlier rejecting algorithm.

19. A method according to claim 14, further comprising:
tracking identified objects between frames in the compressed media data based, at least in part, on the developed affine model.

20. A storage medium comprising a plurality of executable instructions including at least a subset of which that, when executed, implement a method according to claim 14.

21. A system for displaying and/or editing video content comprising:
a memory device to store a plurality of executable instructions; and
a controller, coupled to the memory device, to access and execute at least a subset of the plurality of executable instructions to implement a method according to claim 14.

22. A system comprising:
a media analysis agent, to generate one or more confidence measures associated with a motion vector for at least a subset of blocks of at least a subset of frames of media data in a compressed, digital domain, and identify one or more objects within the compressed media data.

23. A system according to claim 22, further comprising:
a memory device, to store a plurality of executable instructions; and
a controller, coupled to the memory device, to access and execute at least a subset of the plurality of executable instructions to implement the media analysis agent.

24. A system according to claim 22, wherein the media analysis agent generates filters out mismatched blocks from the compressed media data based, at least in part, on the generated confidence measures to produce a resultant image frame, and smoothes the resultant image frame by interpolating motion vector information from neighboring blocks to fill voids left from the filtering.

25. A system according to claim 24, wherein the media analysis agent separates out at least one object from the resultant image frame utilizing a recursive least-square based outlier rejecting algorithm.

26. A system according to claim 25, wherein the media analysis agent generates an affine model for the at least one separated object to track the separated object across image frames of the compressed media data.

27. A method of analyzing compressed video sequence containing video data, the method comprising:
generating confidence measures from the compressed video sequence;
filtering out mismatched video data based on the confidence measures, creating gaps in the compressed video sequence;
filling in the gaps in the compressed video sequence by interpolating between surrounding video data; and
separating a dominant video object from the compressed video sequence.

28. A method of analyzing according to claim 27 further comprising:
locating other video objects based on the dominant video object and storing the dominant and other video objects for later retrieval.

29. A method of analyzing according to claim 28 further comprising:
tracking the dominant video object and the other video objects across the compressed video sequence.

30. A method of analyzing according to claim 28 further comprising:
describing the dominant video object and the other video objects using criteria.

31. A method of analyzing according to claim 30 further comprising:
searching or retrieving the stored dominant or other video objects based on the criteria.

32. A method of analyzing according to claim 27, wherein the step of generating confidence measures includes generating a DC/AC confidence measure, a spatial confidence measure, and a temporal confidence measure.

33. A method of analyzing according to claim 27, wherein the step of filling in the gaps includes using a spatial and temporal filler to fill in the gaps in the compressed video sequence by interpolating between surrounding video data.

34. A method of analyzing according to claim 27, wherein the step of filtering out mismatched video data includes using confidence measures to filter out outliers corresponding to mismatched video data, creating gaps in the compressed video sequence.

35. A storage medium comprising a plurality of executable instructions including at least a subset of which that, when executed, implement a media analysis agent to analyze at least motion vector information in compressed media data, generate one or more confidence measures for the analyzed motion vectors, and identify one or more objects from the compressed media data based, at least in part, on the confidence measure(s).

* * * * *

UNITED STATES PATENT AND TRADEMARK OFFICE
CERTIFICATE OF CORRECTION

PATENT NO.    : 6,501,794 B1
DATED         : December 31, 2002
INVENTOR(S)   : Wang et al.

It is certified that error appears in the above-identified patent and that said Letters Patent is hereby corrected as shown below:

<u>Title page,</u>
Item [73], replace "Microsoft Corporate" with -- Microsoft Corporation --.

Signed and Sealed this

Twenty-ninth Day of April, 2003

JAMES E. ROGAN
*Director of the United States Patent and Trademark Office*